(12) United States Patent
Fujisaki et al.

(10) Patent No.: US 10,599,940 B2
(45) Date of Patent: Mar. 24, 2020

(54) INFORMATION PROCESSING APPARATUS, INFORMATION PROCESSING SYSTEM, AND INFORMATION PROCESSING METHOD

(71) Applicant: FUJITSU LIMITED, Kawasaki-shi, Kanagawa (JP)

(72) Inventors: Naoya Fujisaki, Yokohama (JP); Junichi Yura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 33 days.

(21) Appl. No.: 15/995,967

(22) Filed: Jun. 1, 2018

(65) Prior Publication Data
US 2018/0349723 A1 Dec. 6, 2018

(30) Foreign Application Priority Data
Jun. 6, 2017 (JP) .................................. 2017-111900

(51) Int. Cl.
| | | |
|---|---|---|
| G06K 9/32 | (2006.01) | |
| G06F 17/30 | (2006.01) | |
| G06F 3/0485 | (2013.01) | |
| G06F 16/29 | (2019.01) | |
| G06F 16/432 | (2019.01) | |
| G06K 9/00 | (2006.01) | |
| G06K 9/20 | (2006.01) | |

(52) U.S. Cl.
CPC ......... *G06K 9/3208* (2013.01); *G06F 3/0485* (2013.01); *G06F 16/29* (2019.01); *G06F 16/434* (2019.01); *G06K 9/00671* (2013.01); *G06K 2009/2045* (2013.01)

(58) Field of Classification Search
CPC ...... G06F 16/434; G06F 16/29; G06F 3/0485; G06K 9/3208
See application file for complete search history.

(56) References Cited

U.S. PATENT DOCUMENTS

| | | | | |
|---|---|---|---|---|
| 2014/0063320 | A1* | 3/2014 | Lin ...................... | H04N 1/3871 348/333.11 |
| 2014/0193037 | A1* | 7/2014 | Stitzinger ................ | G09G 5/12 382/103 |
| 2016/0292821 | A1* | 10/2016 | Cho ...................... | G06T 3/4038 |
| 2017/0075638 | A1* | 3/2017 | Poornachandran ... | G06F 3/1423 |
| 2017/0315772 | A1* | 11/2017 | Lee ...................... | H04N 21/434 |

FOREIGN PATENT DOCUMENTS

| | | |
|---|---|---|
| JP | 2004-78549 | 3/2004 |
| JP | 2007-156979 | 6/2007 |
| JP | 2007-293803 | 11/2007 |
| JP | 2013-206317 | 10/2013 |

* cited by examiner

*Primary Examiner* — Lixi C Simpson
(74) *Attorney, Agent, or Firm* — Fujitsu Patent Center

(57) ABSTRACT

An information processing apparatus includes: a memory; and a processor coupled to the memory and configured to: acquire information of a photographed image obtained by panoramic photographing of a plurality of display devices; generate display format information including a point of view which is a part of a display format for each display device when each display device displays content information at a point by using the acquired information of the photographed image; and transmit the display format information in order to display a series of content information having different display formats on the plurality of display devices based on the generated display format information.

3 Claims, 15 Drawing Sheets

INFORMATION PROCESSING APPARATUS, INFORMATION PROCESSING SYSTEM, AND INFORMATION PROCESSING METHOD

CROSS-REFERENCE TO RELATED APPLICATION

This application is based upon and claims the benefit of priority of the prior Japanese Patent Application No. 2017-111900, filed on Jun. 6, 2017, the entire contents of which are incorporated herein by reference.

FIELD

The embodiments discussed herein are related to an information processing apparatus, and the like.

BACKGROUND

In recent years, a provider of a web service in digital contents provides an application that enables a smart terminal to access the web service of the provider. As for the web service, services targeting three-dimensional contents, so-called 360° contents or panoramic contents are known in addition to two-dimensional contents. For example, a service called "Street View (registered trademark)" of Google is a representative service of 360° contents. The 360° contents are also provided, for example, in appreciation of works of museums and galleries, and introduction of real estate properties.

Further, a virtual tourism system provides a virtual tour as a service of contents. In such a virtual tourism system, in a virtual tourism server, an avatar which corresponds to other self of a user searches for a route of a road/railroad route on a map and displays a search position and area information owned by other avatars together with map information on a browser of a user terminal.

Further, as for the service of the contents, a simulated movement processing system simulates movement. Such a simulated movement processing system receives map data from a DB based on a movement start position and a destination, and sets a nearest position and a viewing direction based on a sent route and a specified moving speed. In addition, the simulated movement processing system extracts content information (image data) corresponding to the nearest position by searching the DB and causes a receiving side device to present, for example, a simulated movement screen.

Further, a user's intention is caught from a display operation executed on the contents, and the contents are displayed in an easy-to-view manner in a plurality of peripheral devices. In such a technique, using information on a center position or a direction determined in accordance with the operation on the contents being displayed on a first display screen input into a terminal, a display position of the contents to be displayed on a second display screen (peripheral device) is set. In addition, a display condition for the second display screen (peripheral device) is determined so that the contents are displayed at the set display position.

Related techniques are disclosed in, for example, Japanese Laid-Open Patent Publication Nos. 2007-293803, 2004-078549, 2013-206317, and 2007-156979.

SUMMARY

According to one aspect of the embodiments, An information processing apparatus includes: a memory; and a processor coupled to the memory and configured to: acquire information of a photographed image obtained by panoramic photographing of a plurality of display devices; generate display format information including a point of view which is a part of a display format for each display device when each display device displays content information at a point by using the acquired information of the photographed image; and transmit the display format information in order to display a series of content information having different display formats on the plurality of display devices based on the generated display format information.

The object and advantages of the disclosure will be realized and attained by means of the elements and combinations particularly pointed out in the claims. It is to be understood that both the foregoing general description and the following detailed description are exemplary and explanatory and are not restrictive of the disclosure, as claimed.

DESCRIPTION OF EMBODIMENTS

Incidentally, when a user experiences the 360° contents at an exhibition hall or showrooms, a user intends to operate on a smart terminal and experience the operation. In order to effectively appeal the 360° contents, for example, the user displays real world contents on a plurality of screens (display devices) using the smart terminal as a controller.

When the 360° contents are displayed on a plurality of display devices, a service installer visits the exhibition hall or the showrooms and sets each of the display devices by adjusting the number of the display devices, the direction of each display device and the like. However, for example, the number of the plurality of display devices, or the direction of each display device may not be determined until the start of the exhibition. In such a case, there is a problem in that it is difficult to quickly adapt and provide the 360° contents to the plurality of display devices.

For example, in a technique for displaying the contents in a plurality of peripheral devices for easy viewing, when an installer of a service adjusts the number of the plurality of display devices and the direction of each display device, it may be necessary to set the information of each display device in the terminal. Therefore, it is difficult to quickly adapt and provide the 360° contents to the plurality of display devices.

The virtual tourism system or simulated movement processing system as the content service may not be a technique for providing the contents to the plurality of display devices at first.

In an aspect, the 360° contents may be quickly adapted and provided to the plurality of display devices.

Hereinafter, embodiments of an information processing apparatus, an information processing system, and an information processing method disclosed in the present application will be described in detail with reference to the drawings. Further, in the embodiments, a mobile terminal will be described as an example of the information processing apparatus. In addition, the present disclosure is not limited by the embodiments.

First Embodiment

[Configuration of Information Processing System]

Figure 1:
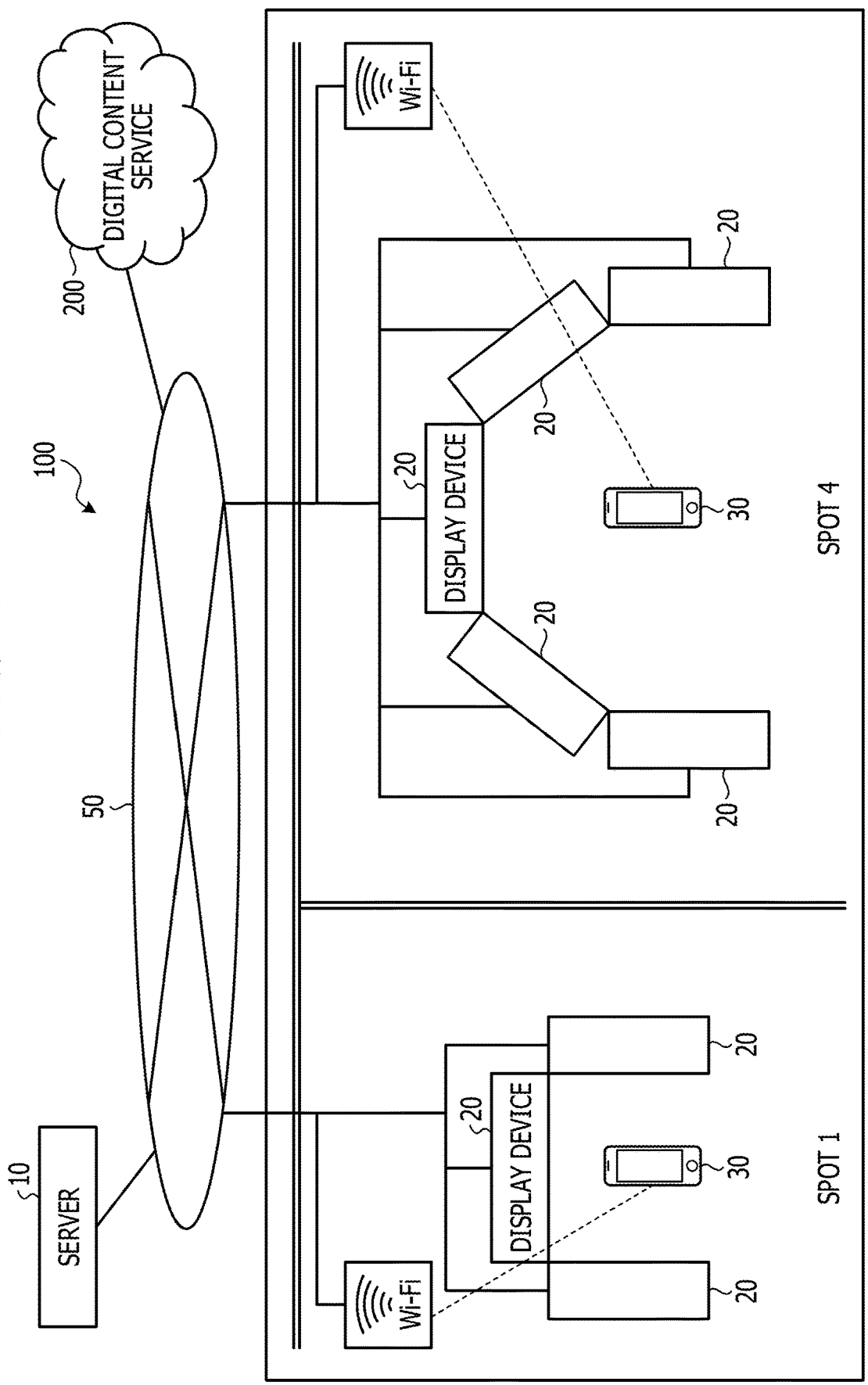
FIG. 1 is a diagram illustrating a configuration of an information processing system according to a first embodiment.

FIG. 1 is a diagram illustrating a configuration of an information processing system according to a first embodiment. The information processing system 100 is a system that provides a service for displaying digital contents (referred to as "content display service"). The information processing system 100 includes a server 10, a plurality of display devices 20, and a mobile terminal 30. The server 10 is coupled to the display device 20 and the mobile terminal 30 via a communication network 50. The display device 20 and the mobile terminal 30 are coupled to the communication network 50 via, for example, WiFi. Further, the server 10, the display device 20, and the mobile terminal 30 are coupled to a digital content service 200 via the communication network 50. The communication network 50 indicates, for example, the Internet.

The digital content service 200 represents sites of various content services. Examples of the digital content service 200 may include services of map contents and services of 360° contents. For example, Google Map (registered trademark) may be cited as the service of the map contents. For example, Street View (registered trademark) may be cited as the service of 360° contents. Further, in the embodiment, it is assumed that the mobile terminal 30 accesses the service of the map contents of the digital content service 200. It is assumed that the display device 20 accesses the service of the 360° contents of the digital content service 200.

The server 10 interlocks the display device 20 and the mobile terminal 30. The mobile terminal 30 analyzes a photographed image obtained by panoramically photographing the plurality of display devices 20 and generates display format information including the number of display devices 20 and a camera point of view. The "display format information" referred to herein indicates information of a display format associated with each piece of identification information for identifying the display device 20 when each of the plurality of display devices 20 displays content information at a predetermined point. For example, the point of view may be mentioned as the display format. The server 10 manages the display format information generated by the mobile terminal 30 and delivers the generated display format information to the display device 20. Each display device 20 displays a series of content information having different display formats based on the display format information delivered from the server 10.

Herein, it is assumed that the information processing system 100 is used for an exhibition hall. There are two spots in the exhibition hall depending on exhibition contents. In each spot, a state of assuming exhibition of video experiences by one or more display devices 20 is displayed. Further, in the embodiment, it is assumed that the mobile terminal 30 accesses the service of the map contents of the digital content service 200. It is assumed that the display device 20 accesses the service of the 360° contents of the digital content service 200.

Upon checking in to spot 1, the mobile terminal 30 analyzes the photographed image obtained by panoramic photographing of the plurality of display devices 20 and generates the display format information including the number of display devices 20 and the camera point of view. The mobile terminal 30 transmits the generated display format information to the server 10.

The server 10 manages the display format information generated by the mobile terminal 30 and delivers the generated display format information to the display device 20. Each display device 20 determines the display format used when its own display device 20 displays the contents based on the display format information delivered from the server 10.

Further, the mobile terminal 30 accesses the service of the map contents and displays the map contents. Herein, when a predetermined operation is performed, the mobile terminal 30 converts an operation event by the predetermined operation into an operation event used by the service of the 360° contents and transmits information on the converted operation event to the server 10. Herein, the predetermined operation is, for example, a case of clicking a predetermined point of the displayed map contents or dragging the displayed map contents.

The server 10 delivers the information on the operation event to each display device 20. Each display device 20 accesses the service of the 360° contents and displays a series of content information having different display formats based on the information on the operation event delivered from the server 10 and the determined display format.

Accordingly, as the mobile terminal 30 checks in at each spot, the user having the mobile terminal 30 may enjoy an image of the 360° contents projected on the display device 20 installed at the checked-in spot.

[Configuration of Server]

Figure 2:
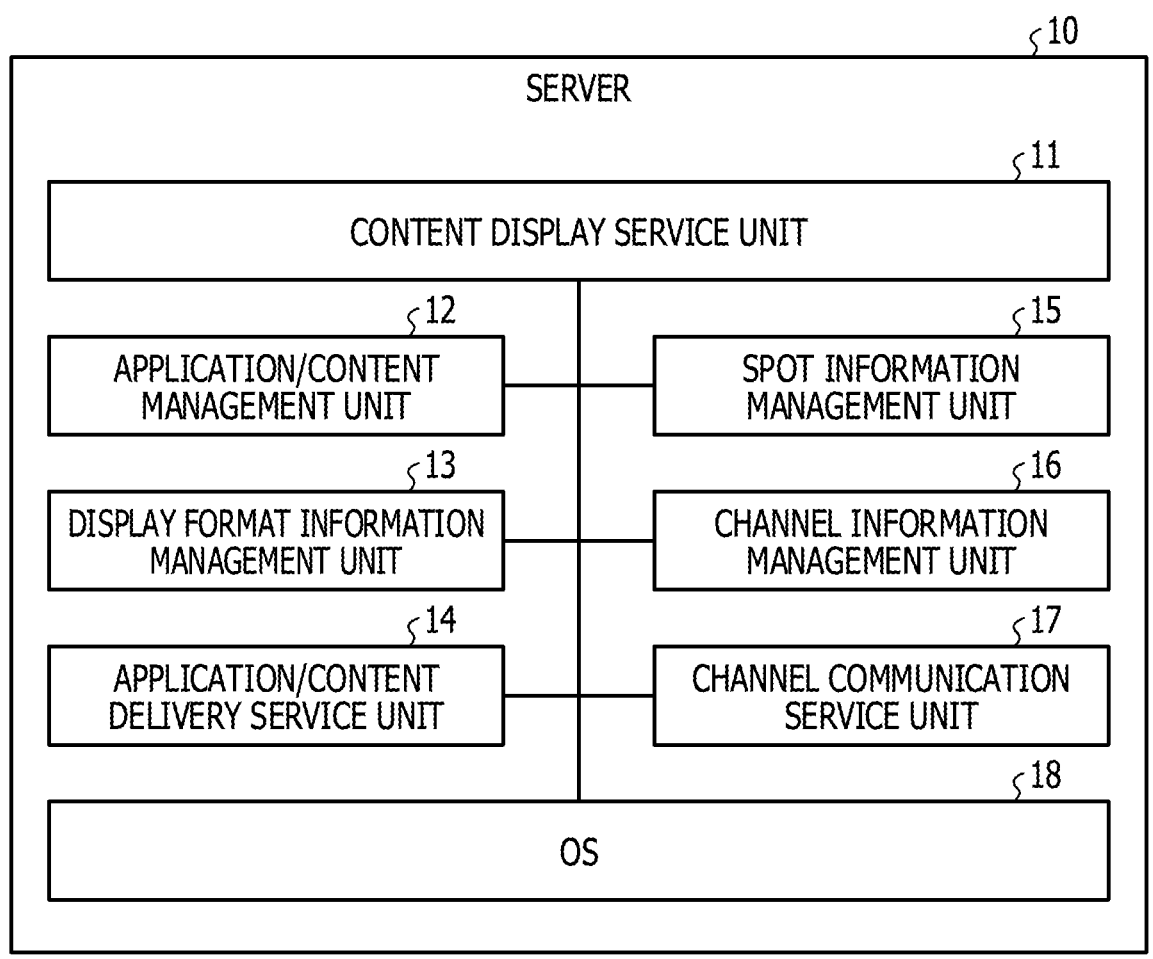
FIG. 2 is a functional block diagram illustrating a configuration of a server according to the first embodiment.

FIG. 2 is a functional block diagram illustrating the configuration of a server according to the first embodiment. As illustrated in FIG. 2, the server 10 includes a content display service unit 11, an application/content management unit 12, a display format information management unit 13, and an application/content delivery service unit 14. Further, the server 10 includes a spot information management unit 15, a channel information management unit 16, a channel communication service unit 17, and an operating system (OS) 18.

The content display service unit 11 provides the content display service in the server 10. The content display service unit 11 may access and edit information managed by the spot information management unit 15, the application/content management unit 12, the display format information management unit 13, and the channel information management unit 16, respectively.

The application/content management unit 12 stores and manages applications and contents (hereinafter referred to as "application/content") for providing the content display service to the display device 20 and the mobile terminal 30.

The display format information management unit 13 stores and manages the display format information generated by the mobile terminal 30. The display format information is, for example, information associating identification information for identifying the display device 20 with the point of view. As an example, "1" as the identification information and "270°" as the point of view are associated with each other. "2" as the identification information and "0°" as the point of view are associated with each other. "3" as the identification information and "90°" as the point of view are associated with each other.

The application/content delivery service unit 14 delivers the application/content for providing the content display service managed by the application/content management unit 12 to the display device 20 and the mobile terminal 30. Examples of the application/content for providing the content display service may include an application/content for accessing the service of the map contents of the digital content service 200. In addition, the examples of the application/content may include an application/content for accessing the service of the 360° contents of the digital content service 200. For example, the application/content delivery service unit 14 delivers the application/content for accessing the service of the map contents to the mobile terminal 30. The application/content delivery service unit 14 delivers the application/content for accessing the service of the 360° contents to the display device 20. A device to which a specific application/content is to be delivered and the specific application/content may be predetermined.

The spot information management unit 15 stores and manages exhibition information on exhibition for each spot and channel name information on communication.

The channel information management unit 16 manages information on devices communicating with each other for each channel name.

The channel communication service unit 17 forms one communication group for one channel with respect to a channel communication client unit 22 of the display device 20 (to be described below) and a channel communication client unit 32 of the mobile terminal 30 (to be described below). In addition, the channel communication service unit 17 provides bidirectional information communication to the channel communication client unit 22 of the display device 20 and provides the bidirectional information communication to the channel communication client unit 32 of the mobile terminal 30. For example, the channel communication service unit 17 receives the display format information from the mobile terminal 30 and outputs the received display format information to the display format information management unit 13 for each channel. In addition, the channel communication service unit 17 delivers the display format information managed by the display format information management unit 13 to the display device 20 for each channel. Further, the channel communication service unit 17 receives the operation event from the mobile terminal 30 and delivers the received operation event to the display device 20 for each channel. In addition, the operation event received from the mobile terminal 30 is the operation event which has been converted into an event included in the application/content executed by the display device 20.

[Configuration of Display Device]

Figure 3:
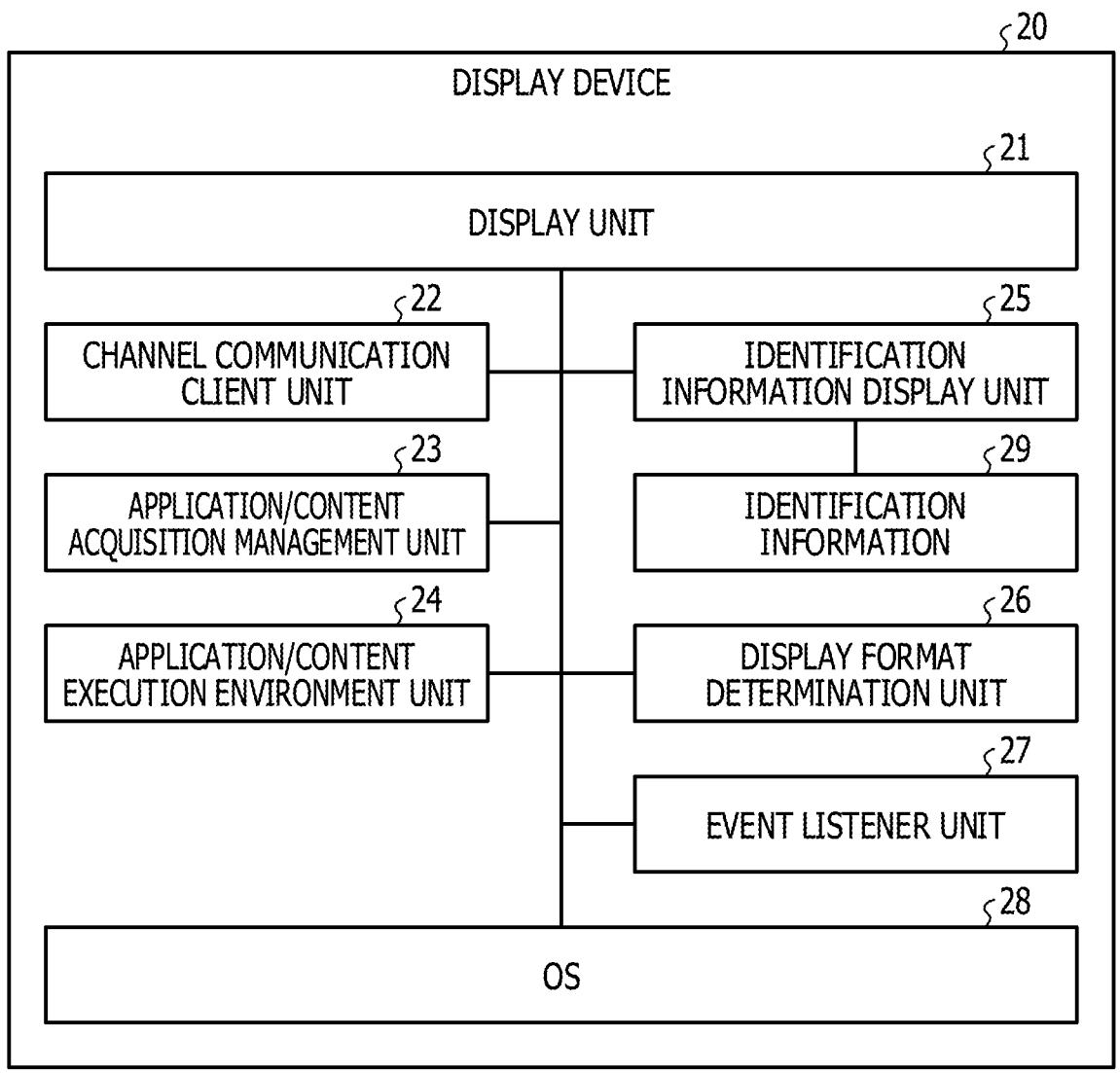
FIG. 3 is a functional block diagram illustrating a configuration of a display device according to the first embodiment.

FIG. 3 is a functional block diagram illustrating the configuration of a display device according to the first embodiment. As illustrated in FIG. 3, the display device 20 includes a display unit 21, a channel communication client unit 22, an application/content acquisition management unit 23, an application/content execution environment unit 24, an identification information display unit 25, a display format determination unit 26, and an event listener unit 27, and an OS 28. Further, the display format determination unit 26 is an example of a determination unit. The application/content execution environment unit 24 is an example of a display unit.

The display unit 21 is a display device for displaying various types of information. For example, the display unit 21 is implemented by a liquid crystal display, an organic electro luminescence (EL) display, or the like.

The channel communication client unit 22 performs the bidirectional information communication with the channel communication service unit 17 of the server 10. For example, the channel communication client unit 22 receives the display format information delivered from the server 10 and outputs the received display format information to the display format determination unit 26. Further, the channel communication client unit 22 receives the operation event delivered from the server 10 and outputs the received operation event to the event listener unit 27.

The application/content acquisition management unit 23 acquires and manages the application/content delivered from the server 10 to the display device 20. For example, the application/content acquisition management unit 23 acquires and manages the application/content for accessing the service of the 360° contents delivered from the server 10 to the display device 20.

The application/content execution environment unit 24 executes the application/content managed by the application/content acquisition management unit 23. For example, the application/content execution environment unit 24 executes the application/content for accessing the service of the 360° contents.

The identification information display unit 25 manages identification information 29 for each display device 20. The identification information display unit 25 displays contents initially displayed by the application/content execution environment unit 24 on the display unit 21 together with the managed identification information 29. The identification information 29 may be, for example, a number, an alphabet, or information that uniquely identifies the display device 20. The identification information 29 is memorized in advance in a memory unit (not illustrated). Further, the memory unit is implemented as, for example, an HDD or an SSD.

The display format determination unit 26 determines the display format used when the own display device 20 displays the contents from the display format information and the identification information 29. As an example, it is assumed that the identification information and the point of view are associated with each other in the display format information. It is assumed that when the identification information is "1," "270°" is associated as the point of view, when the identification information is "2," "0°" is associated as the point of view, and when the identification information is "3," "90°" is associated as the point of view. "1" is mentioned as the identification information 29. Then, the display format determination unit 26 determines "270°" as the point of view by the display format of the own display device 20 from the display format information and the identification information 29.

The event listener unit 27 notifies events of various pieces of hardware from its own device to the currently running application/content. The event listener unit 27 instructs various kinds of hardware of its own device to execute the event from the currently running application/content. For example, the event listener unit 27 notifies the operation event output from the channel communication client unit 22 and the display format determined by the display format determination unit 26 to the currently running application/content. The event listener unit 27 instructs the display unit 21 of its own device from the currently running application/content to execute a response event. As an example, it is assumed that the operation event is a click event at a predetermined point and the determined point of view is 270°. Then, the event listener unit 27 notifies the click event at the predetermined point and 270° which is the determined point of view to the currently running application/content for accessing the service of the 360° contents. Further, the click event at the predetermined point is converted into an event included in the application/content for accessing the service of the 360° contents.

[Configuration of Mobile Terminal]

Figure 4:
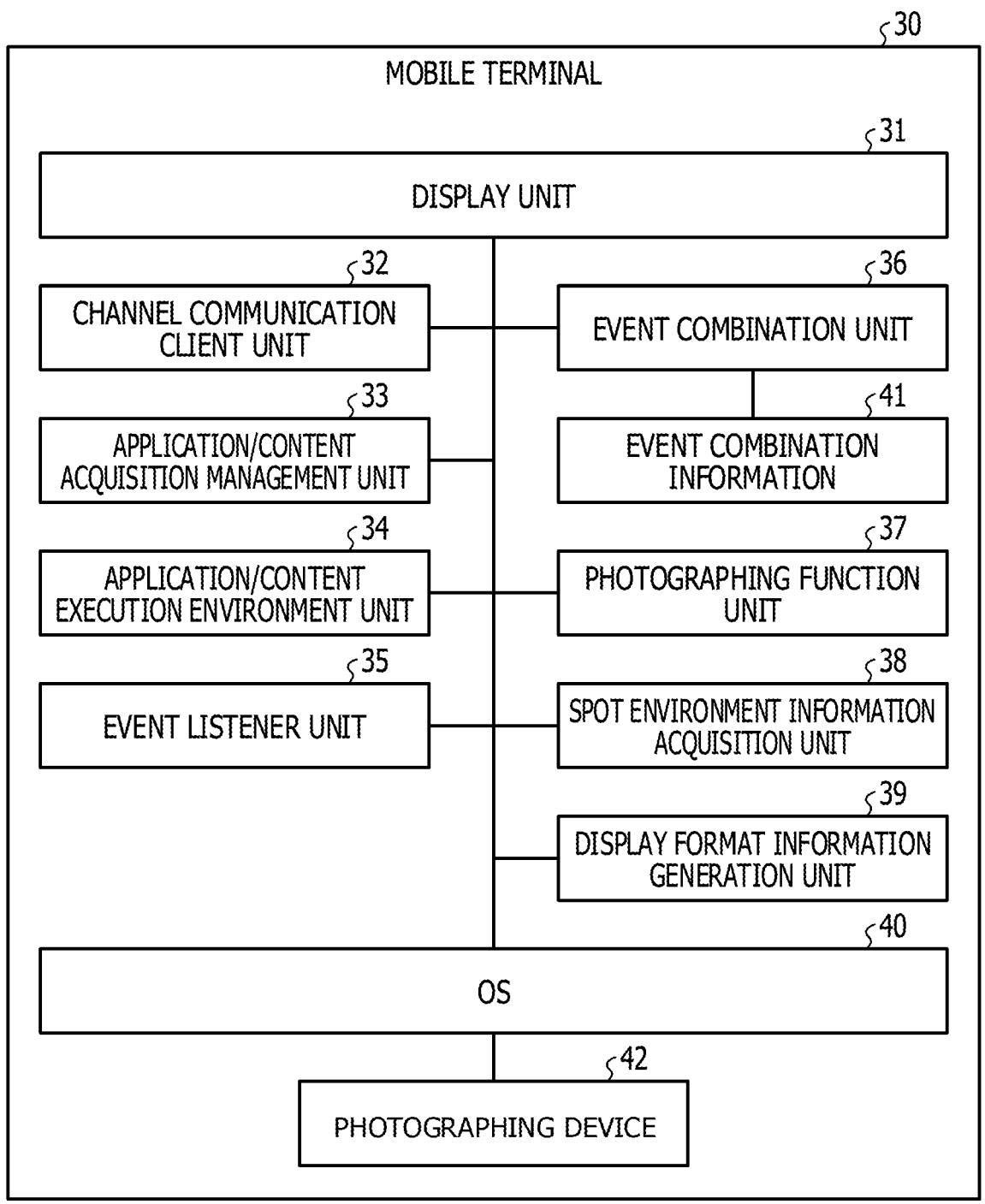
FIG. 4 is a functional block diagram illustrating a configuration of a mobile terminal according to the first embodiment.

FIG. 4 is a functional block diagram illustrating the configuration of a mobile terminal according to the first embodiment. As illustrated in FIG. 4, the mobile terminal 30 includes a display unit 31, a channel communication client unit 32, an application/content acquisition management unit 33, an application/content execution environment unit 34, an event listener unit 35, and an event combination unit 36. Further, the mobile terminal 30 includes a photographing function unit 37, a spot environment information acquisition unit 38, a display format information generation unit 39, and an OS 40. In addition, the spot environment information acquisition unit 38 is an example of an acquisition unit. The display format information generating unit 39 is an example of a generating unit. The channel communication client unit 32 is an example of a transmission unit.

The display unit 31 is a display device for displaying various types of information. For example, the display unit 31 is implemented by the liquid crystal display, the organic electro luminescence (EL) display, or the like.

The channel communication client unit 32 performs the bidirectional information communication with the channel communication service unit 17 of the server 10. For example, the channel communication client unit 32 transmits the display format information generated by the display format information generation unit 39 (to be described below) to the serve 10. Further, the channel communication client unit 32 transmits the operation event converted by the event combination unit 36 (to be described below) to the server 10.

The application/content acquisition management unit 33 acquires and manages the application/content delivered from the server 10 to the mobile terminal 30. For example, the application/content acquisition management unit 33 acquires and manages the application/content for accessing the service of the map contents delivered from the server 10 to the mobile terminal 30.

The application/content execution environment unit 34 executes the application/content managed by the application/content acquisition management unit 33. For example, the application/content execution environment unit 34 executes the application/content for accessing the service of the map contents.

The event listener unit 35 notifies the events of various pieces of hardware from its own device to the currently running application/content. The event listener unit 34 instructs various kinds of hardware of its own device to execute the event from the currently running application/content. For example, the event listener unit 34 notifies the operation event of the display unit 31 to the currently running application/content. The event listener unit 34 instructs the display unit 21 of its own device to execute the response event to the operation event from the currently running application/content. As an example, it is assumed that the operation event is the click event at the predetermined point. Then, the event listener unit 35 notifies the click event at the predetermined point to the currently running application/content for accessing the service of the map contents. As another example, it is assumed that the operation event is a drag event. Then, the event listener unit 35 notifies the drag event to the currently running application/content for accessing the service of the map contents.

The event combination unit 36 combines, couples, or converts events of various pieces of hardware from its own device and information thereof, and events of various pieces of hardware to the display device 20 and information thereof. For example, the event combination unit 36 converts the operation event of the display unit 31 of its own device into the operation event when the display unit 21 of the display device 20 temporarily operates the event. As an example, it is assumed that the operation event as the event included in the currently running application/content for accessing the service of the map contents is the click event at the predetermined point. Then, the event combination unit 36 converts the click event including a latitude and a longitude at the predetermined point into the event included in the running application/content for accessing the service of the 360° contents in the display device 20.

Further, the event combination unit 36 memorizes information regarding conversion from one event to the other event in a memory unit in advance as event combination information 41. Further, the memory unit is implemented as, for example, the HDD or the SSD. A specific example of the event combination information 41 is described below.

The photographing function unit 37 has a function of a photographing device 42 (to be described below). Such a function is used as one of means for acquiring environmental information. For example, after each display device 20 arranged in the spot displays the identification information 29, the photographing function unit 37 acquires a photographed image obtained by panoramic photographing of the spot by the photographing device 42 as the environmental information. In addition, the photographing device 42 is, for example, a camera.

In cooperation with the function of the photographing function unit 37, the spot environment information acquisition unit 38 analyzes the photographed image obtained by photographing the spot and acquires the environmental information in the photographed image.

The display format information generation unit 39 generates the display format information. For example, the display format information generation unit 39 generates the display format information using the environment information acquired by the spot environment information acquisition unit 38. For example, the display format information generation unit 39 generates the display format information including the point of view for each display device 20 when each display device 20 displays 360° contents at a predetermined point. The display format information is, for example, information associating identification information for identifying the display device 20 with the point of view. As an example, "1" as the identification information and "270°" as the point of view are associated with each other. "2" as the identification information and "0°" as the point of view are associated with each other. "3" as the identification information and "90°" as the point of view are associated with each other.

[Example of Generation of Display Format Information]

Figure 5:
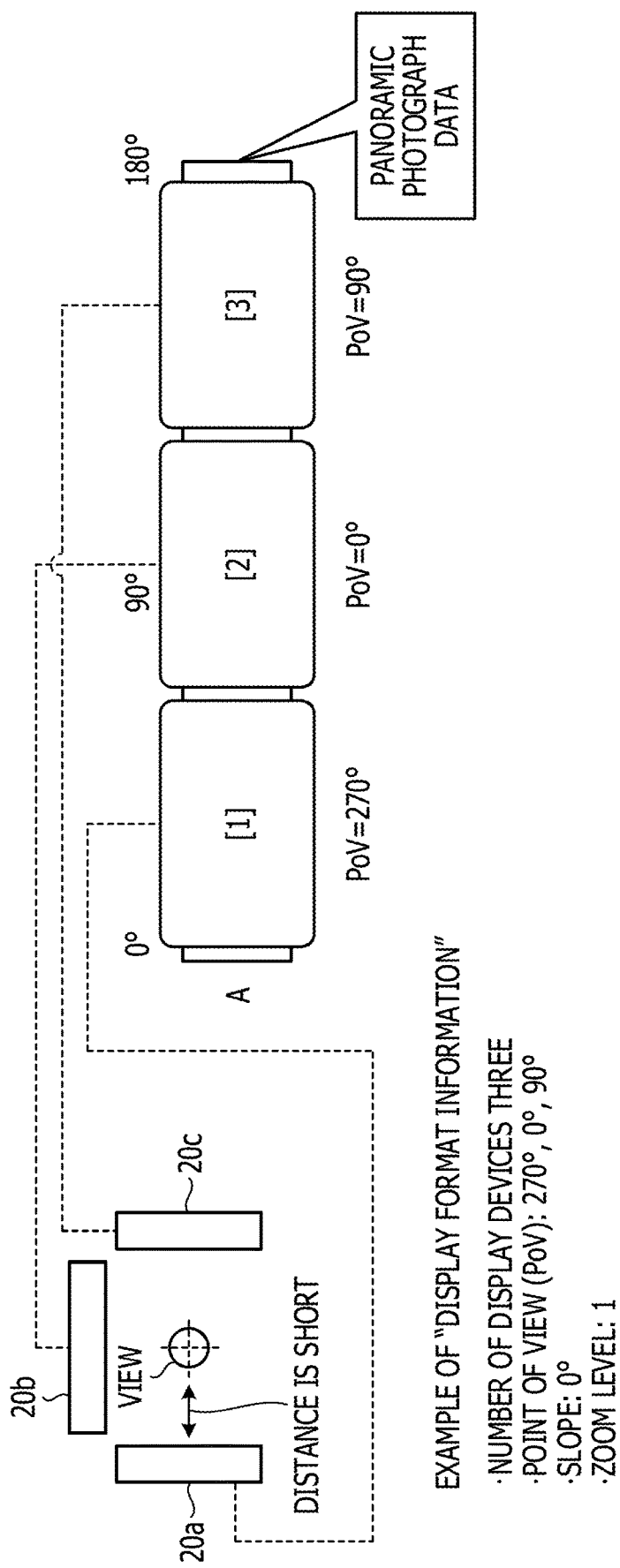
FIG. 5 is a diagram illustrating an example of display format information generation.
Figure 6:
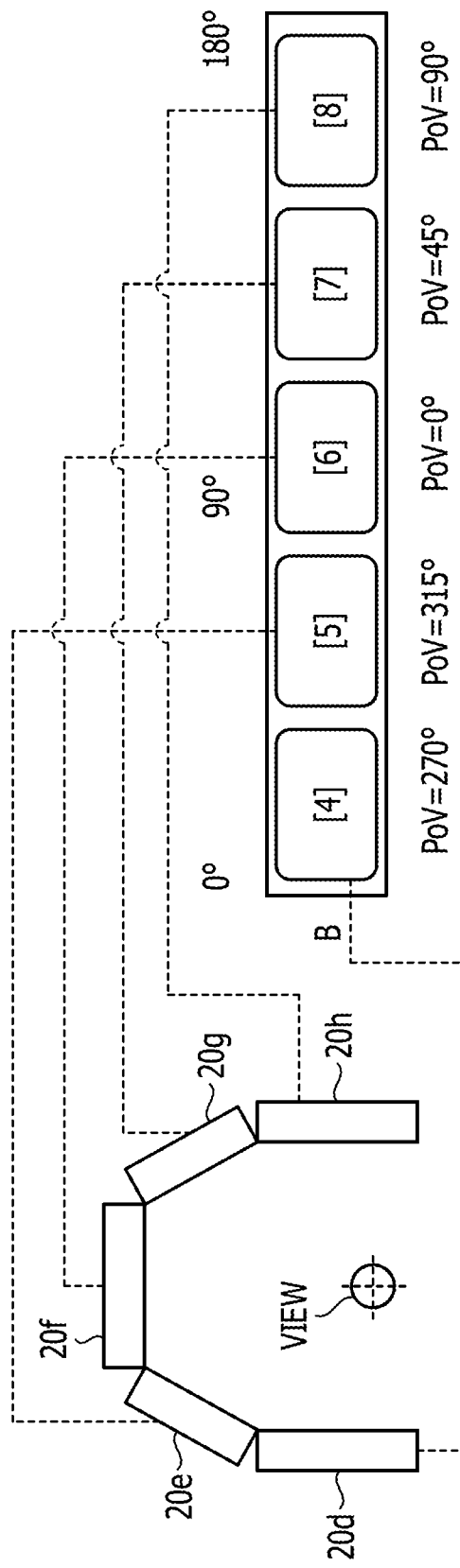
FIG. 6 is a diagram illustrating another example of the display format information generation.
Figure 7:
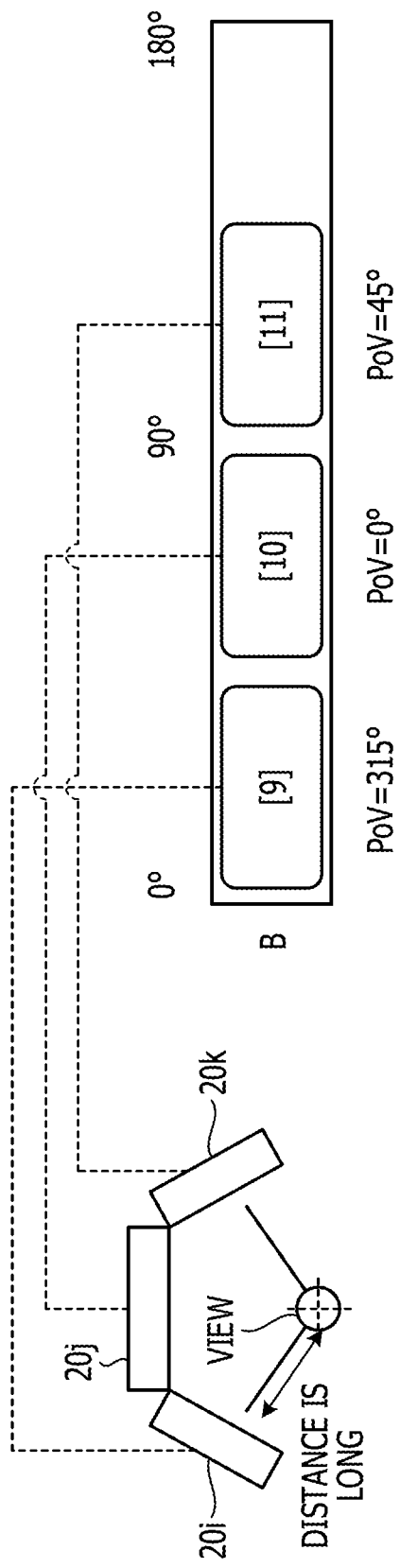
FIG. 7 is a diagram illustrating yet another example of the display format information generation.

FIGS. 5 to 7 are diagrams illustrating an example of generation of display format information. Further, information [1] to [11] displayed on the display device 20 at one spot is the identification information of each display device 20. For example, the identification information display unit 25 of each display device 20 displays the identification information of its own display device 20. In addition, the photographing device 42 is described as the camera.

The spot environment information acquisition unit 38 of the mobile terminal 30 analyzes a panoramic photograph taken at the spot and acquires the environmental information. For example, the spot environment information acquisition unit 38 acquires from the environmental information including, for example, the identification information displayed on the display device 20, a display order of the display device 20, and a subject distance up to the display device 20.

Further, the display format information generation unit 39 of the mobile terminal 30 generates the display format information using the environmental information acquired by the spot environment information acquisition unit 38. For example, the display format information generation unit 39 estimates the display format used when the display device 20 displays the contents with respect to each display device disposed at the spot.

As illustrated in FIG. 5, display devices 20a, 20b, and 20c are displayed in panoramic photograph data. The display device 20a and the display device 20c are cases where the distance from the viewpoint of the camera is short. "1" is displayed on the display device 20a as the identification information. "2" is displayed on the display device 20b as the identification information. "3" is displayed on the display device 20c as the identification information. Herein, it is assumed that the display device 20a located at the leftmost side of the panoramic photograph data is set to 0°.

Under such circumstances, the display format information generation unit 39 sets the point of view to 0° by positioning at 90° with respect to the display device 20b positioned in the middle of the panoramic photograph and by a layout pattern such as the direction of the display device 20b or the number of installed display devices 20b. Further, the display format information generation unit 39 sets the point of view to 90° by positioning at 180° with respect to the display device 20c positioned on the right side of the panoramic photograph and by the layout pattern such as the direction of the display device 20c or the number of installed display devices 20c. In addition, the display format information generation unit 39 sets the point of view to 270° by positioning at 0° with respect to the display device 20a positioned on the left side of the panoramic photograph and by the layout pattern such as the direction of the display device 20a or the number of installed display devices 20a. For example, the display format information generation unit 39 generates the display format information at the spot as follows. The number of display devices is three. The point of view (PoV) corresponding to the identification information "1" is 270°. The PoV corresponding to the identification information "2" is 0°. The PoV corresponding to the identification information "3" is 90°. A slope is 0°. A zoom level is one time. Further, the distance or a zoom up to each display device may be estimated from the subject distance from the view of the camera.

As illustrated in FIG. 6, display devices 20d, 20e, 20f, 20g, and 20h are displayed in the panoramic photograph data. "4" is displayed on the display device 20d as the identification information. "5" is displayed on the display device 20e as the identification information. "6" is displayed on the display device 20f as the identification information. "7" is displayed on the display device 20g as the identification information. "8" is displayed on the display device 20h as the identification information. Herein, it is assumed that the display device 20d located at the leftmost side of the panoramic photograph data is set to 0°.

Under such circumstances, the display format information generation unit 39 sets the point of view to 0° by positioning at 90° with respect to the display device 20f positioned in the middle of the panoramic photograph and by the layout pattern such as the direction of the display device 20f or the number of installed display devices 20f. In addition, the display format information generation unit 39 sets the point of view to 45° by positioning at 135° with respect to the display device 20g positioned on the right side of the display device 20f and by the layout pattern such as the direction of the display device 20g or the number of installed display devices 20g. Further, the display format information generation unit 39 sets the point of view to 90° by positioning at 180° with respect to the display device 20h positioned on the right side of the display device 20g and by the layout pattern such as the direction of the display device 20h or the number of installed display devices 20h. In addition, the display format information generation unit 39 sets the point of view to 315° by positioning at 90° with respect to the display device 20e positioned on the left side of the display device 20f and by the layout pattern such as the direction of the display device 20e or the number of installed display devices 20e. Further, the display format information generation unit 39 sets the point of view to 270° by positioning at 0° with respect to the display device 20d positioned on the left side of the display device 20e and by the layout pattern such as the direction of the display device 20d or the number of installed display devices 20d. for example, the display format information generation unit 39 generates the display format information at the spot as follows. The number of display devices is five. The PoV corresponding to the identification information "4" is 270°. The PoV corresponding to the identification information "5" is 315°. The PoV corresponding to the identification information "6" is 0°. The PoV corresponding to the identification information "7" is 45°. The PoV corresponding to the identification information "8" is 90°. The slope is 0°. The zoom level is two times. Further, the distance or zoom up to each display device may be estimated from the subject distance from the view of the camera.

As illustrated in FIG. 7, display devices 20i, 20j, and 20k are displayed in the panoramic photograph data. The display device 20i and the display device 20k are cases where the distance from the viewpoint of the camera is long. "9" is displayed on the display device 20i as the identification information. "10" is displayed on the display device 20j as the identification information. "11" is displayed on the display device 20k as the identification information. Herein, the display device 20*i* located at the leftmost side of the panoramic photograph data is set to 0°.

Under such circumstances, the display format information generation unit 39 sets the point of view to 0° by positioning at 45° with respect to the display device 20*j* positioned in the middle of the panoramic photograph and by the layout pattern such as the direction of the display device 20*j* or the number of installed display devices 20*j*. Further, the display format information generation unit 39 sets the point of view to 45° by positioning at 90° with respect to the display device 20*k* positioned on the right side of the display device 20*j* and by the layout pattern such as the direction of the display device 20*k* or the number of installed display devices 20*k*. In addition, the display format information generation unit 39 sets the point of view to 315° by positioning at 0° with respect to the display device 20*i* positioned on the left side of the display device 20*j* and by the layout pattern such as the direction of the display device 20*i* or the number of installed display devices 20*i*. For example, the display format information generation unit 39 generates the display format information at the spot as follows. The number of display devices is three. The PoV corresponding to the identification information "9" is 315°. The PoV corresponding to the identification information "10" is 0°. The PoV corresponding to the identification information "11" is 45°. The slope is 0°. The zoom level is two times. Further, the distance and zoom up to each display device may be estimated from the subject distance from the view of the camera.

[Example of Estimation Method of Subject Distance]

Figure 8:
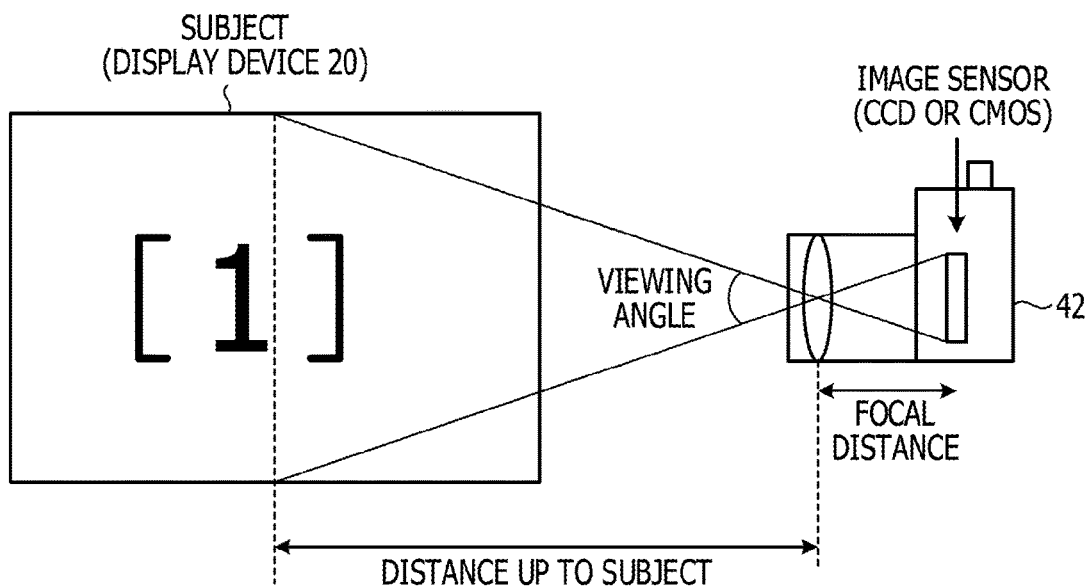
FIG. 8 is a diagram illustrating an example of a method for estimating a subject distance.

Herein, a method of estimating the subject distance from the view of the camera to each display device 20 will be described with reference to FIG. 8. FIG. 8 is a diagram illustrating an example of a method for estimating a subject distance. Further, in the method of estimating the subject distance, the subject distance is estimated by using, for example, a method (http://keisan.casio.jp/exec/system/1378430392) of calculating a photographing range of the camera.

Herein, the photographing device 42 is described as the camera. As illustrated in FIG. 8, the object distance is obtained from specification information of the camera and vertical and horizontal lengths of the subject. Herein, the specification information of the camera includes a focal distance and a vertical or horizontal size of an image sensor in the camera. Examples of the image sensor include a CCD and a CMOS. Since a height (width) of the subject in the panoramic photograph data is known, the distance up to the subject is obtained based on the focal distance, the vertical and horizontal sizes of the image sensor, and the height (width) of the subject, as illustrated in FIG. 8. For example, the spot environment information acquisition unit 38 analyzes the panoramic photograph data obtained by photographing the spot and estimates the subject distance up to the display device 20 included in the environmental information in the panoramic photograph data. In addition, the spot environment information acquisition unit 38 may also determine the zoom level of the identification information displayed on the display device 20 from the estimated subject distance.

[Example of Event Combination Information]

Figure 9:
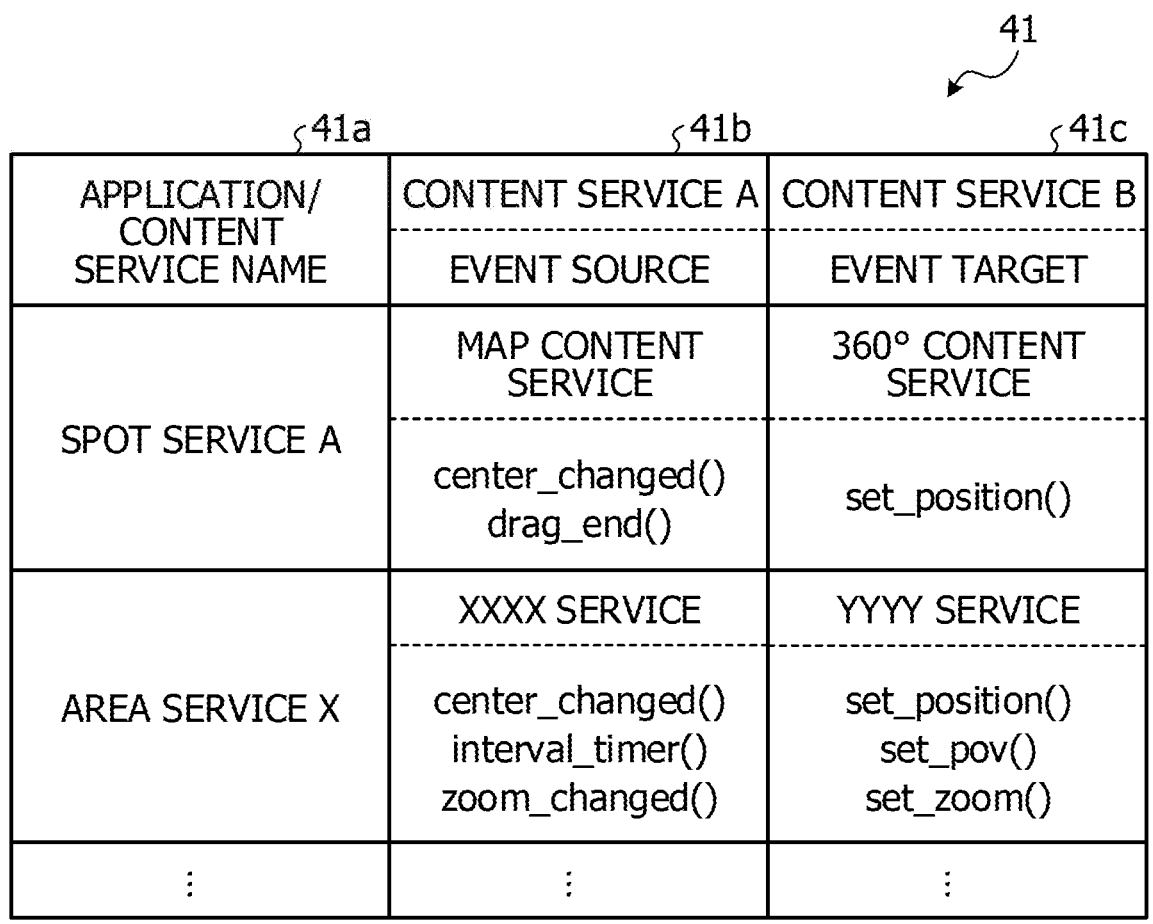
FIG. 9 is a diagram illustrating an example of event combination information according to the first embodiment.

Herein, an example of the event combination information 41 according to the first embodiment will be described with reference to FIG. 9. FIG. 9 is a diagram illustrating an example of event combination information according to the first embodiment. As illustrated in FIG. 9, the event combination information 41 is information in which an event/source 41*b* of content service A and an event/target 41*c* of content service B are associated with an application/content service name 41*a*.

The application/content service name 41*a* is a service name of the application/content provided by the content display service executed by the information processing system 100. As the application/content service name 41*a*, a spot service of content display described in FIG. 1 may be used. Further, the application/content service name 41*a* is not limited to the spot service of the content display and may be an area service of the content display or another service of the content display.

The event/source 41*b* of the content service A is an event provided by the content service according to a specific operation. In the embodiment, the event/source 41*b* of the content service A is the event of the content service used by the mobile terminal 30. The event/source 41*b* of the content service A is referred to as an event/source. The content service A represents, for example, the service of the map contents.

An event/target 41*c* of content service B is an event provided by the content service according to a specific operation. In the embodiment, the event/target 41*c* of the content service B is the event of the content service used by the display device 20. The event/target 41*c* of the content service B is referred to as an event/target. The content service B represents, for example, the service of the 360° contents.

As an example, when the application/content service name 41*a* is "spot service A," the event/source 41*b* of content service A is set to "center_changed( ) drag_end( )" of a "map content service." The event/target 41*c* of the content service B is set to "set_position( )" of "360° content service." In such an example, the event when a map displayed using the map content service on the display unit 31 of the mobile terminal 30 is dragged is referred to as the event/source. An event for acquiring the 360° contents corresponding to a position (latitude and longitude) dragged on the display unit 21 of the display device 20 is set as the event/target. In the mobile terminal 30, referring to the event combination information 41, when the event combination unit 36 receives the event/source of the display unit 31 of the mobile terminal 30, the event combination unit 36 converts the corresponding event/source into the event/target of the display unit 21 of the display device 20. Thereafter, in the display device 20, the event listener unit 27 notifies to the service of the 360° contents the point of view determined by the display format determination unit 26 and the converted event/target. Then, the event listener unit 27 may display the 360° contents corresponding to the position (latitude and longitude) dragged on the display unit 31 of the mobile terminal 30.

[Sequence up to Generation of Display Format Information]

Figure 10:
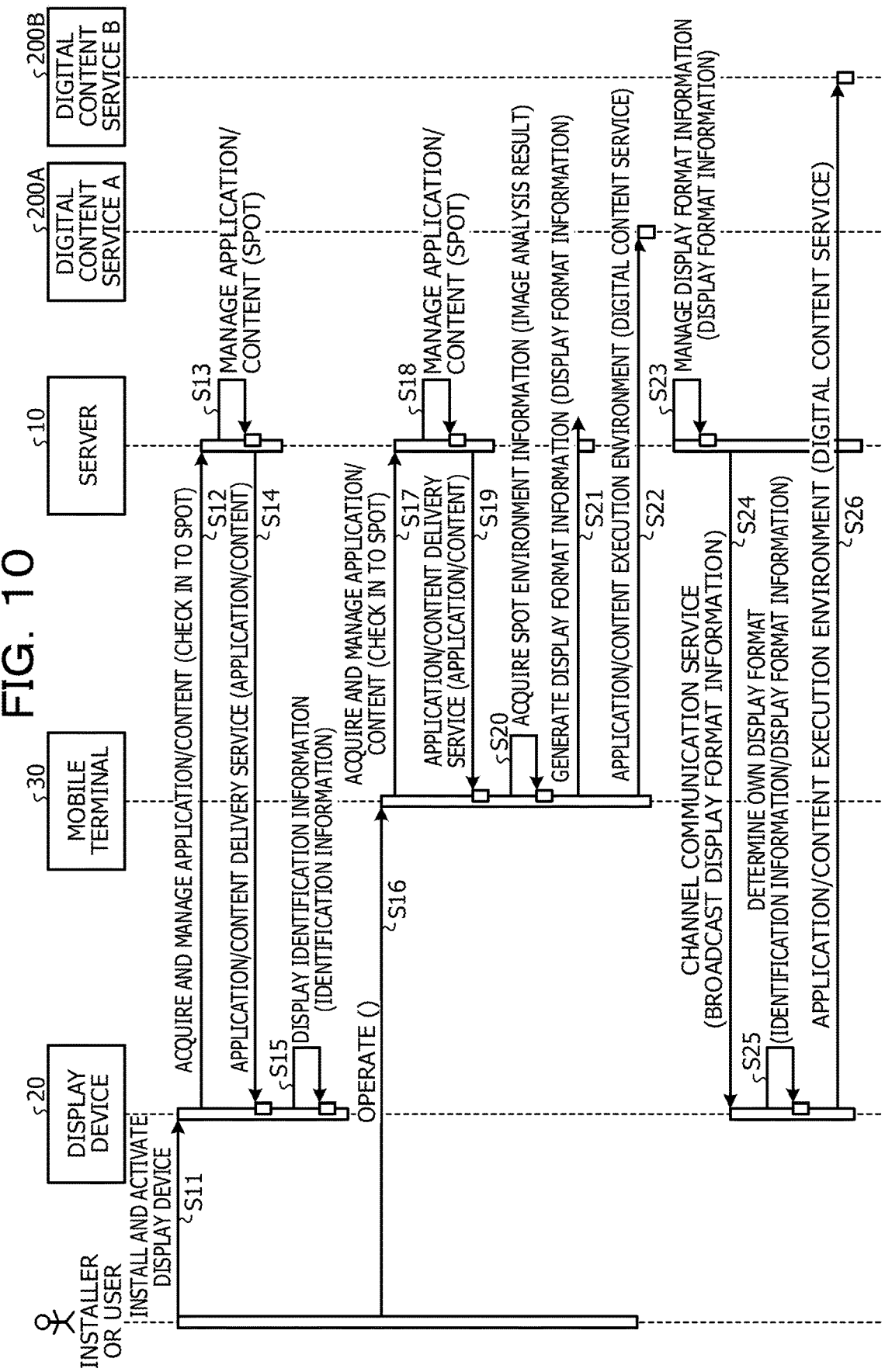
FIG. 10 is a diagram illustrating a sequence up to the display format information generation according to the first embodiment.

FIG. 10 is a diagram illustrating a sequence up to the display format information generation according to the first embodiment.

As illustrated in FIG. 10, an installer installs and activates the display device 20 for each spot (step S11).

In the display device 20, the application/content acquisition management unit 23 checks in to the spot, accesses the server 10, and requests the delivery of the application/content (step S12). Check-in is performed when a connection is made with a wireless access point.

In the server 10, the application/content management unit 12 manages the application/content associated with the spot (step S13). In addition, the application/content delivery service unit 14 delivers to the display device 20 the application/content corresponding to the spot, which is the application/content managed by the application/content management unit 12 (step S14). Herein, the application/content for accessing the service of the 360° contents is delivered to the display device 20.

In the display device 20, the application/content acquisition management unit 23 acquires and manages the application/content delivered from the server 10. Herein, the application/content for accessing the service of the 360° contents is managed. In addition, the identification information display unit 25 displays the identification information 29 memorized in the memory unit on the display unit 21 (step S15).

Subsequently, after each piece of identification information 29 is displayed on all the display units 21 of the display device 20 within the spot, the user of the mobile terminal 30 performs an operation for checking in to the spot (step S16).

Then, in the mobile terminal 30, the application/content acquisition management unit 33 checks in to the spot, accesses the server 10, and requests the delivery of the application/content (step S17).

In the server 10, the application/content management unit 12 manages the application/content associated with the spot (step S18). In addition, the application/content delivery service unit 14 delivers to the mobile terminal 30 the application/content corresponding to the spot, which is the application/content managed by the application/content management unit 12 (step S19). Herein, the application/content for accessing the service of the map contents is delivered to the mobile terminal 30.

In the mobile terminal 30, the application/content acquisition management unit 33 acquires and manages the application/content delivered from the server 10. Herein, the application/content for accessing the service of the map contents is managed. In addition, in cooperation with the function of the photographing function unit 37, the spot environment information acquisition unit 38 analyzes the photographed image obtained by photographing the check-in spot and acquires the environmental information as a result of the image analysis (step S20). In addition, the display format information generation unit 39 generates the display format information using the acquired environmental information and transmits the generated display format information to the server 10 (step S21). For example, the display format information generation unit 39 generates the display format information including information obtained by associating the identification information 29 of the display device 20 with the point of view and transmits the generated display format information to the server 10. In addition, the application/content execution environment unit 34 accesses digital content service A so as to execute the map contents indicating the managed application/content (step S22).

In the server 10, the display format information management unit 13 manages display format information transmitted from the mobile terminal 30 (step S23). In addition, the channel communication service unit 17 broadcasts the display format information managed by the display format information management unit 13 to each display device 20 (step S24).

In the display device 20, the display format determination unit 26 determines a display format (for example, the point of view) corresponding to the identification information 29 of its own device by using the display format information broadcasted from the server 10 (step S25). In addition, the application/content execution environment unit 24 accesses digital content service B so as to execute the 360° contents indicating the application/content using the display format (step S26).

[Sequence of Use Start]

Figure 11:
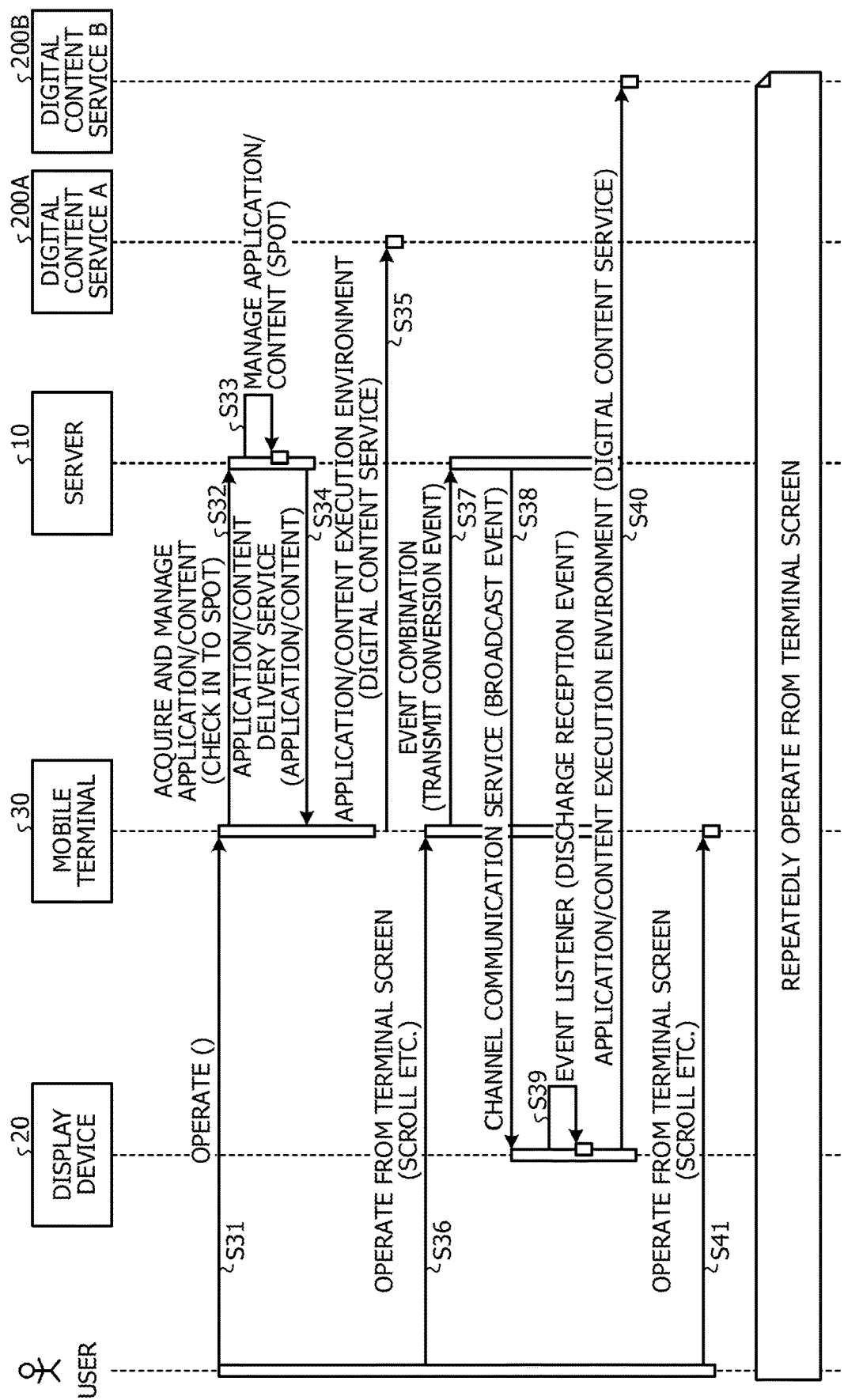
FIG. 11 is a diagram illustrating the sequence of a use start according to the first embodiment.

FIG. 11 is a diagram illustrating the sequence of a use start according to the first embodiment. Further, in FIG. 11, it is assumed that the server 10 manages the display format information for one spot and each display device 20 determines the display format of its own device.

As illustrated in FIG. 11, the user of the mobile terminal 30 performs the operation for checking in to the spot (step S31). The check-in is performed when a connection is made with the wireless access point.

Then, in the mobile terminal 30, the application/content acquisition management unit 33 checks in to the spot, accesses the server 10, and requests the delivery of the application/content (step S32).

In the server 10, the application/content management unit 12 manages the application/content associated with the spot (step S33). In addition, the application/content delivery service unit 14 delivers to the mobile terminal 30 the application/content corresponding to the spot, which is the application/content managed by the application/content management unit 12 (step S34). Herein, the application/content for accessing the service of the map contents is delivered to the mobile terminal 30.

In the mobile terminal 30, the application/content acquisition management unit 33 acquires and manages the application/content delivered from the server 10. Herein, the application/content for accessing the service of the map contents is managed. In addition, the application/content execution environment unit 34 accesses digital content service A so as to execute the map contents indicating the managed application/content (step S35).

Subsequently, the user of the mobile terminal 30 performs the operation from a terminal screen (the display unit 31) (step S36). Such an operation is, for example, an operation of scrolling or dragging.

In the mobile terminal 30, the event combination unit 36 converts the operation event (event/source) of the display unit 31 into the event/target of the display unit 21 of the display device 20 by referring to the event combination information 41. In addition, the event combination unit 36 notifies the channel communication client unit 32 of the converted event/target. Moreover, the channel communication client unit 32 transmits the notified event/target to the server 10 (step S37).

In the server 10, the channel communication service unit 17 receives the event/target transmitted from the mobile terminal 30 and broadcasts the received event/target to each display device 20 (step S38).

In the display device 20, the event listener unit 27 outputs the received event/target and the display format of its own device to the application/content execution environment unit 24 so as to discharge the received event/target (step S39). In addition, the application/content execution environment unit 24 accesses digital content service B so as to execute the event/target corresponding to the display format of its own device (step S40).

Subsequently, the user of the mobile terminal 30 performs a next operation from the terminal screen (the display unit 31) (step S41). Then, the processing of each of steps S32 to S40 is executed.

Further, the user of the mobile terminal 30 may repeat the operation from the terminal screen (display unit 31) until checking out from the spot or until the content display service ends. Check-out is performed when the connection with the wireless access point is disconnected.

It is described that the event combination unit 36 of the mobile terminal 30 converts the operation event (event/source) of the terminal screen (display unit 31) into the event/target of the display unit 21 of the display device 20 as an event combination. In such a case, the event listener unit 27 of the display device 20 outputs the received event/target and the display format of its own device to the application/content execution environment unit 24 and causes the application/content execution environment unit 24 to execute the event/target corresponding to the display format of its own device. As an example of the operation of such an operation event, the clicking operation or the dragging operation is described, but the operation is not limited thereto. The operation of the operation event may be based on a motion of a body of the user. For example, the dragging operation may be detected by a motion of the user who shakes a hand or a leg having the mobile terminal 30.

[Example of Display Screen]

Figure 12:
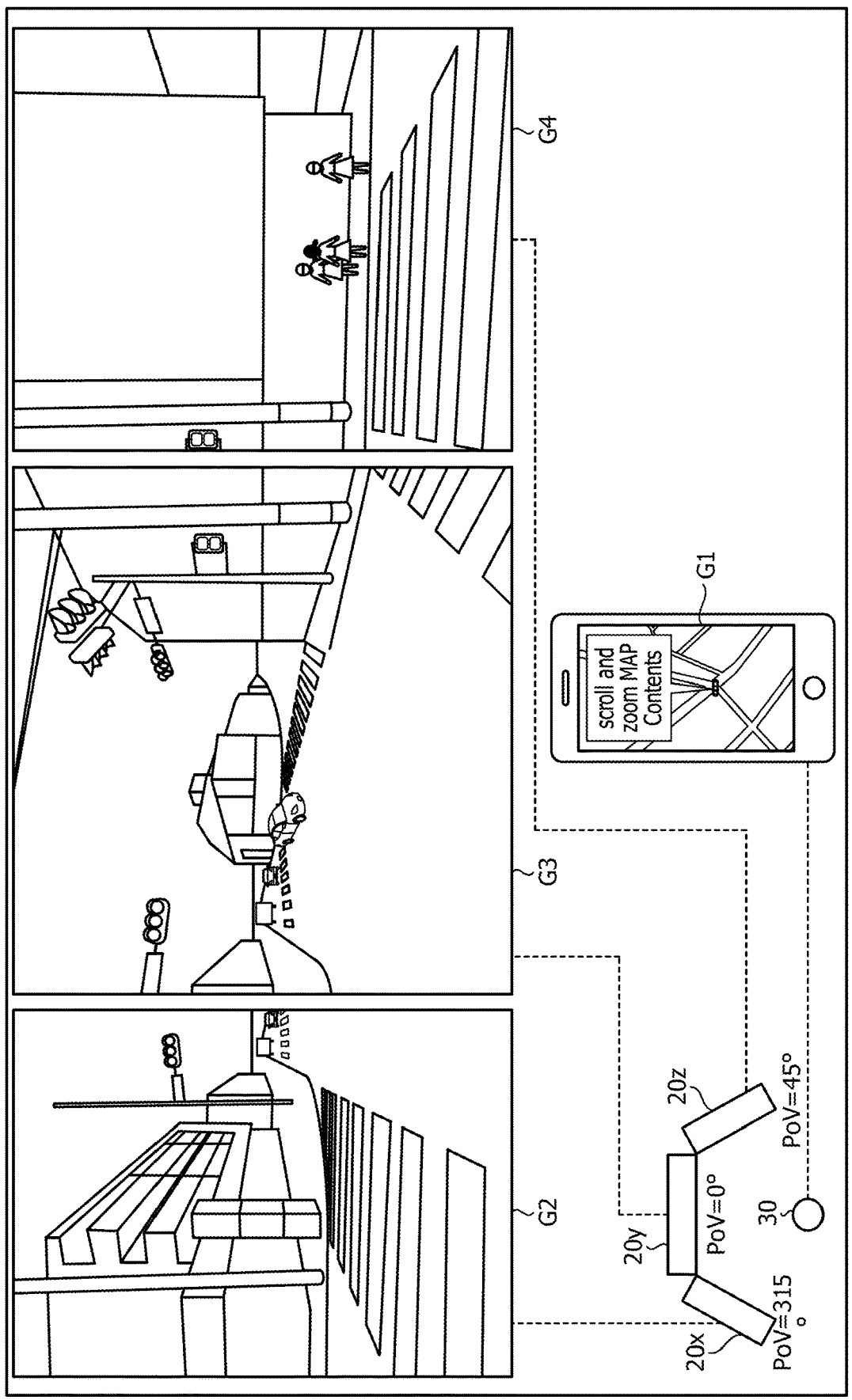
FIG. 12 is a diagram illustrating an example of each display screen according to the first embodiment.

FIG. 12 is a diagram illustrating an example of each display screen according to the first embodiment. The display screen denoted by reference numeral G1 is a display screen displayed on the display unit 31 of the mobile terminal 30 and a display screen of map contents around a predetermined area. The display screens denoted by reference numerals G2, G3, and G4 are display screens displayed on the display units 21 of display devices 20x, 20y, and 20z, respectively. For example, it is assumed that the display device 20x is determined to have a display format of 315° as the PoV. It is assumed that the display device 20y is determined to have the display format of 0° as the PoV. It is assumed that the display device 20z is determined to have the display format of 45° as the PoV.

Under such circumstances, it is assumed that the user of the mobile terminal 30 displaying the map contents around a predetermined area scrolls and zooms the predetermined point. Then, the display device 20x notifies to the service of the 360° contents the event/target and PoV 315° converted from the event/source indicating the result of scrolling and zooming the predetermined point. As a result, the display device 20x may display the 360° contents corresponding to the position (latitude and longitude) scrolled and zoomed by the mobile terminal 30 on the display screen G2. Further, the display device 20y notifies to the service of the 360° contents the event/target and PoV 0° converted from the event/source indicating the result of scrolling and zooming the predetermined point. As a result, the display device 20y may display the 360° contents corresponding to the position (latitude and longitude) scrolled and zoomed by the mobile terminal 30 on the display screen G3. Further, the display device 20z notifies to the service of the 360° contents the event/target and PoV 45° converted from the event/source indicating the result of scrolling and zooming the predetermined point. As a result, the display device 20z may display the 360° contents corresponding to the position (latitude and longitude) scrolled and zoomed by the mobile terminal 30 on the display screen G4.

In this manner, in the first embodiment, the mobile terminal 30 acquires the information of the photographed image obtained by panoramic photographing of the plurality of display devices 20. The mobile terminal 30 generates the display format information including the point of view which is a part of the display format for each display device 20 when each display device 20 displays content information at a predetermined point by using the acquired information of the photographed image. The mobile terminal 30 transmits the display format information so as to display a series of content information having different display formats on the plurality of display devices 20, respectively based on the generated display format information. According to such a configuration, the mobile terminal 30 may rapidly adapt and display the 360° contents onto the plurality of display devices 20. For example, even if the number of the plurality of display devices 20, the direction of each display device 20, or the like is determined immediately before the start of the exhibition, the mobile terminal 30 generates the display format information including the point of view for each display device 20 by using information of the photographed image obtained by panoramic photographing of the latest number of respective display devices 20 or the latest direction of each display device 20. As a result, the mobile terminal 30 may rapidly adapt and display the 360° contents onto the plurality of display devices 20.

Further, in the first embodiment, the mobile terminal 30 converts the event for the content service accessed by the mobile terminal 30 into the event used by the content service which is different from the content service accessed by the mobile terminal 30 and is accessed by the plurality of display devices 20. The mobile terminal 30 transmits the display format information and the converted event information so as to display a series of content information having different display formats on the plurality of display devices 20, respectively based on the display format information and the converted event. According to such a configuration, when the content service performed by the mobile terminal 30 is different from the content service performed by the display device 20, the mobile terminal 30 converts the event for its own terminal into the event used in the display device 20. As a result, the mobile terminal 30 may causes visually recognition of a series of content information having different display formats on the plurality of display devices 20.

Second Embodiment

However, it has been described that the mobile terminal 30 according to the first embodiment accesses, for example, the service of the map contents and displays the map contents on the display unit 31. However, the mobile terminal 30 is not limited to this, and may display a cross marker at the center of the screen at the same time when displaying the map contents on the display unit 31.

Therefore, descriptions will be made on a case where the mobile terminal 30 according to the second embodiment displays the cross marker at the center of the screen at the same time when displaying the map contents on the display unit 31.

[Configuration of Mobile Terminal According to Second Embodiment]

Figure 13:
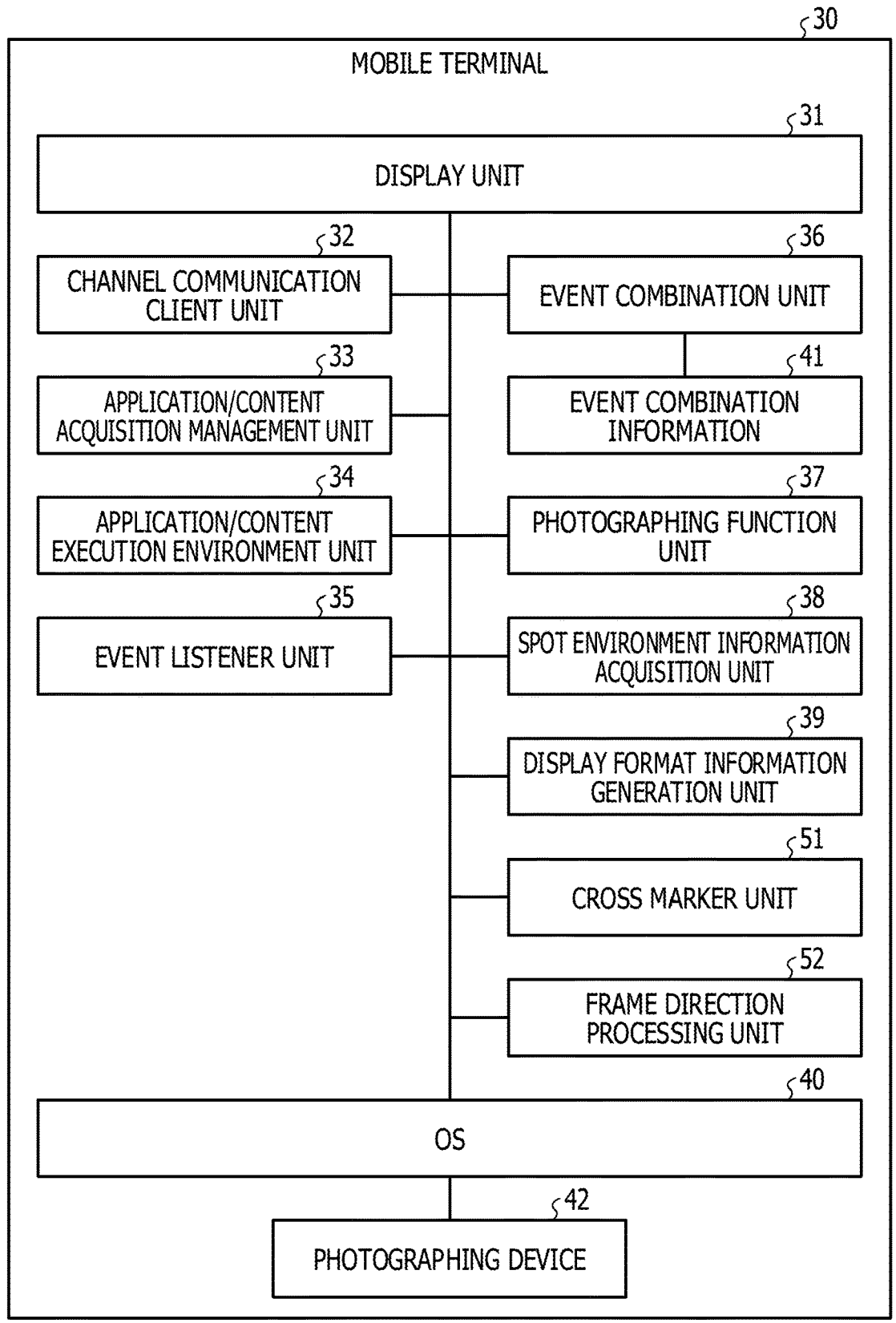
FIG. 13 is a functional block diagram illustrating a configuration of a mobile terminal according to a second embodiment.

FIG. 13 is a functional block diagram illustrating the configuration of the mobile terminal according to a second embodiment. Further, the same components as those of the mobile terminal 30 illustrated in FIG. 4 according to the first embodiment are denoted by the same reference numerals, and descriptions of duplicate components and operations thereof will be omitted. The difference between the first embodiment and the second embodiment is that a cross marker unit 51 and a frame direction processing unit 52 are added. Further, the cross marker unit 51 is an example of the display unit. The frame direction processing unit 52 is an example of the calculation unit.

When the contents are displayed on the display unit 31 by the application/content execution environment unit 34, the cross marker unit 51 displays the cross marker at the center of the display unit 31.

The frame direction processing unit 52 calculates the difference in content rotation with respect to the directions of the cross marker and the frame or a corner of the display unit 31 while associating the frame or corner of the display unit 31 with each display device 20. In addition, the frame direction processing unit 52 outputs the calculated difference information of the content rotation to the event combination unit 36.

Thereafter, the event combination unit 36 transmits the difference information of the content rotation calculated by the frame direction processing unit 52 to the server 10 via the channel communication client unit 32 together with the converted operation event. In the server 10, the channel communication service unit 17 delivers the operation event and the difference information of the content rotation, which are received from the mobile terminal 30, to each display device 20. In each display device 20, the display format determination unit 26 receives the operation event and the difference information of the content rotation from the channel communication client unit 22 and sets the operation event including the difference information in the display format of its own device and notifies the operation event to the application/content execution environment unit 24. The application/content execution environment unit 24 drives the operation event information of the display format of the application/content execution environment unit 24 by means of the currently running application/content for the displayed contents.

As a result, even when the user moves or changes his/her direction and the user is about to lose sight of the direction displayed on each display device 20, the mobile terminal 30 may detect the direction by associating the frame or corner with each display device 20 or from the cross marker.

Third Embodiment

However, it has been described that in the server 10 according to the first embodiment, the channel communication service unit 17 receives the operation event transmitted from the mobile terminal 30 and delivers the received operation event to the display device 20. However, the server 10 may manage the operation event transmitted from the mobile terminal 30 as a usage log.

Accordingly, descriptions will be made on a case where the server 10 according to the third embodiment may manage the operation event transmitted from the mobile terminal 30 as the usage log.

[Configuration of Server According to Third Embodiment]

Figure 14:
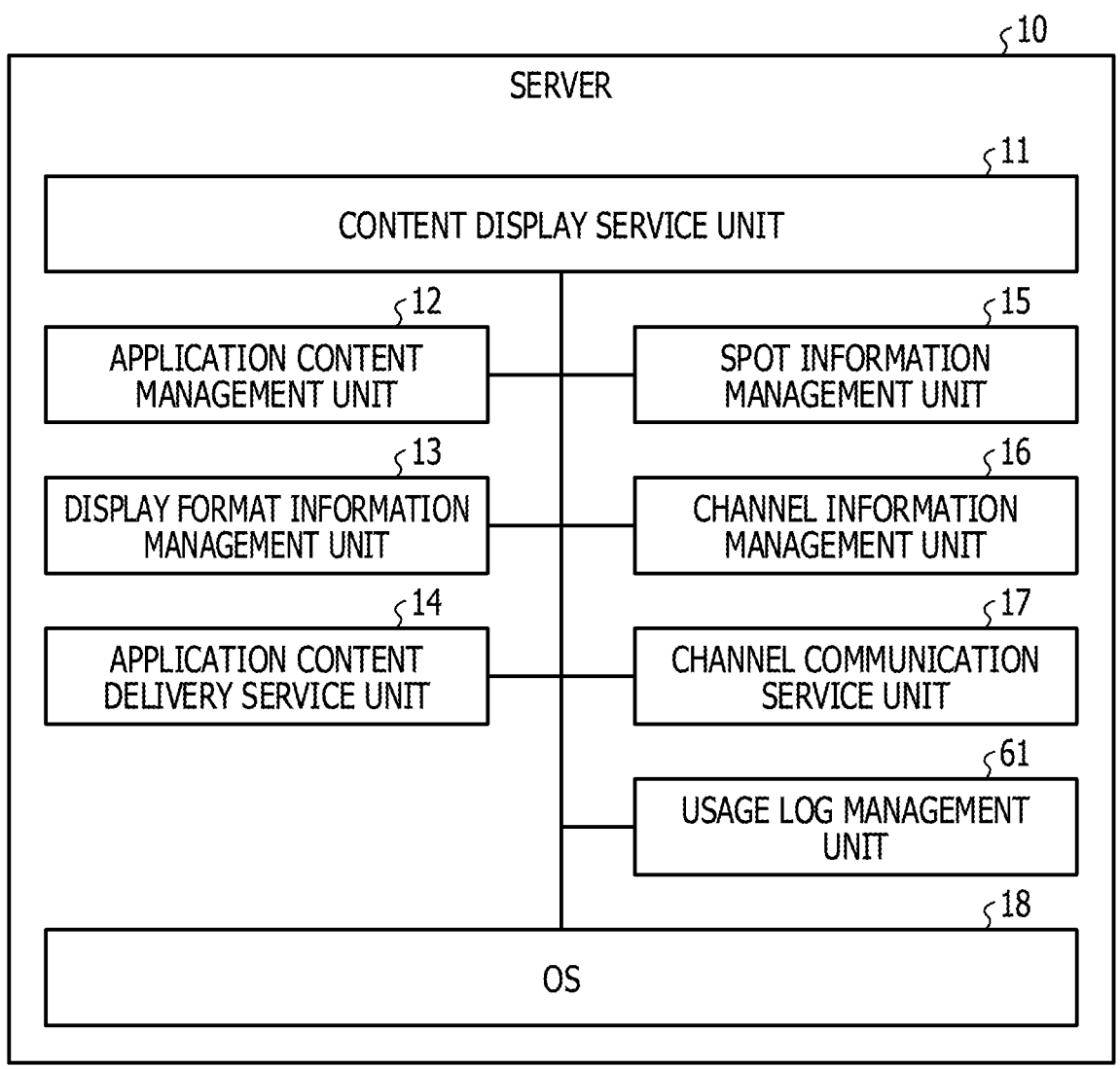
FIG. 14 is a functional block diagram illustrating a configuration of a server according to a third embodiment.

FIG. 14 is a functional block diagram illustrating the configuration of the server according to a third embodiment. Further, the same components as those of the server 10 illustrated in FIG. 2 according to the first embodiment are denoted by the same reference numerals, and descriptions of duplicate components and operations thereof will be omitted. The difference between the first embodiment and the third embodiment is that a usage log management unit 61 is added.

The usage log management unit 61 obtains the operation event received by the channel communication service unit 17 and manages the acquired operation event as the usage log.

Accordingly, the server 10 may provide the usage log to existing systems and services on the Internet, for example. For example, when a staff of a travel agent creates a user's own travel package, the user uses the content display service to have simulated experience. Information on the user who has the simulated experience is accumulated in the usage log. The travel agency may create better travel packages by using the usage log. In addition, the travel agency combines and statistically processes the information of the travel package actually sold in the existing system and the information of the usage log, thereby visualizing a sales effect of a case where the content display service is used and a case where the content display service is not used. Further, the travel agency may also determine features such as popular travel destinations, efficient visiting routes of travel destinations, and the like and visualize changes in features over a long period of time.

[Others]

Further, in the first to third embodiments, it is not necessary that the respective constituent elements of the illustrated apparatus are physically configured as illustrated. For example, a concrete form of distribution and integration of the apparatus is not limited to the illustration and all or some units may be configured to be functionally or physically distributed and integrated by an arbitrary unit according to various loads, use situations or the like. For example, the event combination unit 36 may be distributed to a processing unit for combining the events, a processing unit for coupling the events, and a processing unit for converting the events. Further, the photographing function unit 37 and the photographing device 42 may be integrated. A memory unit (not illustrated) may be coupled as an external device of the mobile terminal 30 via a communication network 50. The memory unit (not illustrated) may be coupled as the external device of the serve 10 via the communication network 50. The memory unit (not illustrated) may be coupled as the external device of the display device 20 via the communication network 50.

Figure 15:
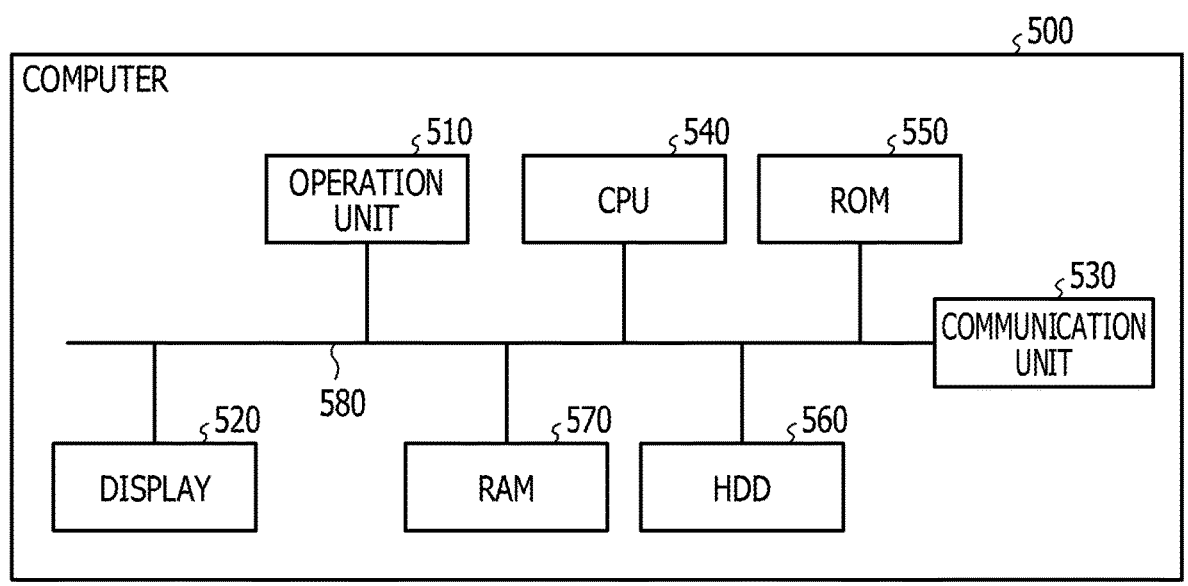
FIG. 15 is a diagram illustrating a hardware configuration of a computer executing an information processing program according to the first, second, and third embodiments.

FIG. 15 is a diagram illustrating a hardware configuration of a computer executing an information processing program according to the first, second, and third embodiments. As illustrated in FIG. 15, a computer 500 includes an operation unit 510, a display 520, a communication unit 530, a CPU 540, a ROM 550, an HDD 560, and a RAM 570. The operation unit 510, the display 520, the communication unit 530, the CPU 540, the ROM 550, the HDD 560, and the RAM 570 are coupled via a bus 580. Further, the SSD may be used instead of the HDD 560.

In an HDD 560, an information processing program which shows the same functions as the channel communication client unit 32, the application/content acquisition management unit 33, the application/content execution environment unit 34, the event listener unit 35, the event combination unit 36, the photographing function unit 37, the spot environment information acquisition unit 38, and the display format information generation unit 39 of the mobile terminal 30 described in the first, second, and third embodiments, an information processing program that shows the same functions as the application/content management unit 12, the display format information management unit 13, the application/content delivery service unit 14, the spot information management unit 15, the channel information management unit 16, and the channel communication service unit 17 of the server 10, or an information processing program that shows the same functions as the channel communication client unit 22, the application/content acquisition management unit 23, the application/content execution environment unit 24, the identification information display unit 25, the display format determination unit 26, and the event listener unit 27 of the display device 20 is memorized. In addition, the HDD 560 may not particularly store all data described in the first, second, and third embodiments and the HDD 560 may store data used for processing.

Under such circumstances, a CPU 540 reads the information processing program from the HDD 560 and loads the read information processing program to a RAM 570. As a result, the information processing program functions as an information processing process. The information processing process loads various data read from the HDD 560 into an area allocated to the information processing process in a memory area of the RAM 570 and executes various processing using the various loaded data. For example, one example of the processing executed by the information processing process includes the processing illustrated in FIG. 10 or 11, etc. Further, in the CPU 540, all processing units described in the first, second, and the third embodiments may not particularly operate and a processing unit corresponding to a processing to be executed may be virtually realized.

Further, the above-described information processing program may not particularly be memorized in the HDD 560 or a ROM 550 from the beginning. For example, the information processing program is memorized in a flexible disk inserted into a computer 500, so-called, "portable physical media" including an FD, a compact disc (CD)-ROM, a digital versatile disc or digital video disc (DVD), a magneto-optic disk, an integrated circuit (IC) card, etc. In addition, the computer 500 may acquire the information processing program from the portable physical media and execute the information processing program. Further, the information processing program may be memorized in another computer or server apparatus coupled to the computer 500 via a public line, the Internet, a LAN, a WAN, etc., and the computer 500 may acquire the information processing program from another computer or server apparatus and execute the acquired information processing program.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. An information processing apparatus comprising:
a memory; and
a processor coupled to the memory and configured to:
acquire information of a photographed image obtained by panoramic photographing of a plurality of display devices;
generate display format information including a point of view which is a part of a display format for each display device when each display device displays content information at a point by using the acquired information of the photographed image; and
transmit the display format information in order to display a series of content information having different display formats on the plurality of display devices based on the generated display format information,
wherein the processor is further configured to: convert a first event for a first content service to be accessed by the information processing apparatus into a second event used by a second content service which is different from the first content service and is to be accessed by the plurality of display devices; and
transmit the display format information and event information of the second event so as to display the series of content information having different display formats on the plurality of display devices, respectively, based on the display format information and the second event,
wherein the processor is further configured to: display a cross marker at the center of a screen at the time of displaying contents of the first content service on the screen, and
wherein the processor is further configured to: calculate a difference in rotation of the contents displayed on the screen with respect to direction of a frame of the screen and the cross marker according to a rotating operation of the information processing apparatus; and transmit information on the calculated difference together with the display format information and the information of the second event.

2. An information processing method comprising:
acquiring, by an information processing apparatus in an information processing system including a plurality of display devices and a server, information of a photographed image obtained by panoramic photographing of the plurality of display devices;
generating display format information including a point of view which is a part of a display format for each display device when each display device displays content information at a point by using the acquired information of the photographed image;
transmitting the generated display format information to the server, delivering, by the server, the display format information transmitted from the information processing apparatus to the plurality of display devices;
determining, by each of display devices, the display format corresponding to the respective display devices based on the display format information delivered from the server; and
displaying the content information in accordance with the determined display format,
wherein the information processing apparatus: converts a first event for a first content service to be accessed by the information processing apparatus into a second event used by a second content service which is different from the first content service and is to be accessed by the plurality of display devices; and
transmits the display format information and event information of the second event so as to display the series of content information having different display formats on the plurality of display devices, respectively, based on the display format information and the second event,
wherein the information processing apparatus: displays a cross marker at the center of a screen at the time of displaying contents of the first content service on the screen, and
wherein the information processing apparatus: calculates a difference in rotation of the contents displayed on the screen with respect to direction of a frame of the screen and the cross marker according to a rotating operation of the information processing apparatus; and transmits information on the calculated difference together with the display format information and the information of the second event.

3. An information processing apparatus comprising:
a memory; and
a processor coupled to the memory and configured to:
  acquire information of a photographed image obtained by panoramic photographing of a plurality of display devices;
  generate display format information including a point of view which is a part of a display format for each display device when each display device displays content information at a point by using the acquired information of the photographed image;
  convert a first event for a first content service to be accessed by the information processing apparatus into a second event used by a second content service which is different from the first content service and is to be accessed by the plurality of display devices; and
  transmit the display format information and event information of the second event so as to display a series of content information having different display formats on the plurality of display devices, respectively, based on the display format information and the second event,
wherein the processor is further configured to: display a cross marker at the center of a screen at the time of displaying contents of the first content service on the screen, and
wherein the processor is further configured to: calculate a difference in rotation of the contents displayed on the screen with respect to direction of a frame of the screen and the cross marker according to a rotating operation of the information processing apparatus; and transmit information on the calculated difference together with the display format information and the information of the second event.

* * * * *